Patented Dec. 29, 1936

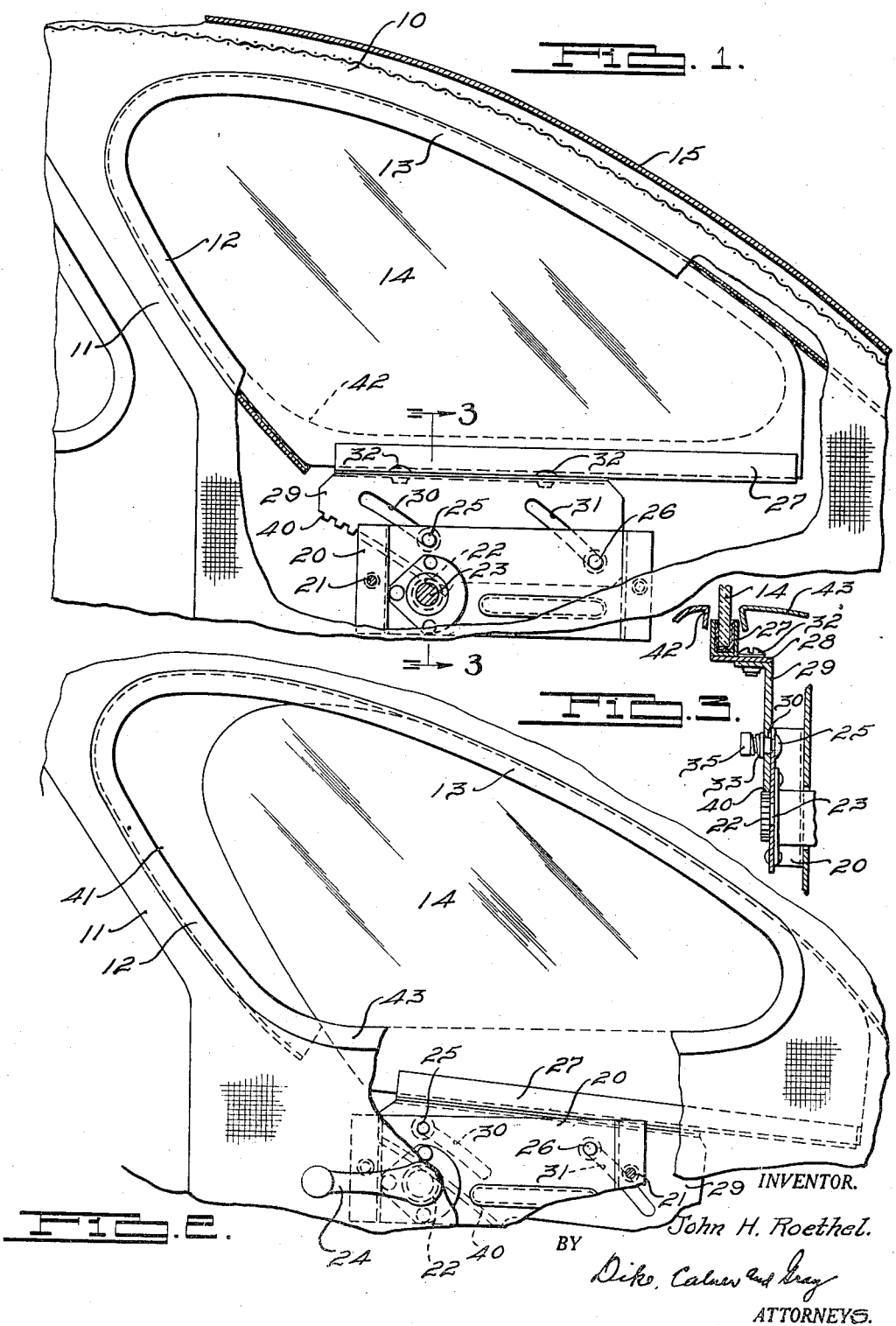

2,066,057

UNITED STATES PATENT OFFICE 2,066,057

WINDOW REGULATOR

John H. Roethel, Detroit, Mich.

Application December 31, 1934, Serial No. 759,869

15 Claims. (Cl. 296—44)

This invention relates to ventilating window structures for vehicle bodies and especially, although not exclusively, to improved means for mounting and operating the rear quarter window of an automobile body having streamlined characteristics.

One of the objects of the invention is to provide a window structure and window regulator mechanism designed and operative to swing the window downwardly and rearwardly in such manner as to provide a ventilating slot between the forward edge of the window glass and the adjacent frame, whereby air may be withdrawn by suction from the body during the forward travel of the vehicle.

Another object of the invention is to provide a ventilating window structure especially desirable for streamlined rear quarters of automobiles and wherein the window glass may be shifted rearwardly away from the front edge of the window frame to provide a vertical or upright ventilating slot, without, however, requiring the glass to travel rearwardly beyond the necessary limit of the window frame glass channel when the window is fully closed.

By virtue, therefore, of the improved construction, the sloping rear edge of the window frame may follow the slope of the roof and extend in close proximity thereto, since the depth of penetration of the glass in the glass channel along said edge remains substantially constant, the glass being shifted in a path corresponding to the inclination of the window frame.

Other objects and advantages of the invention will appear from the following description and appended claims when considered in connection with the accompanying drawing forming a part of this specification wherein like reference characters designate corresponding parts in the several views.

In said drawing:

Fig. 1 is a fragmentary side elevation, partly broken away, of a rear quarter panel of a streamlined automobile body embodying the present invention, with the window glass in fully closed position.

Fig. 2 is a view similar to Fig. 1, showing the window glass in ventilating position; and Fig. 3 is a detail vertical section taken substantially along the line 3—3 of Fig. 1, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is illustrated, by way of example, a rear quarter body panel of a closed automobile body of streamlined design. The body panel is provided with a window opening having a glass panel mounted therein and adapted to be tilted or shifted in its plane rearwardly and downwardly into ventilating position, and to be moved in the reverse direction into closed position, by a regulator mechanism located within the wall of the rear quarter paneling. When open, the space between the forward edge of the window glass and the adjacent pillar provides a ventilating slot.

As illustrated in the drawing, the rear quarter body panel 10 is provided with a window opening and a front pillar 11. The framing of the window opening in part is in the form of a closed window glass receiving channel having a forward upright portion 12 carried by the pillar and an upper rearwardly sloping portion 13 within which the correspondingly shaped edges of the glass panel 14 are confined when the glass is in position to fully close the window opening. It will be noted that the roof 15 of the body slopes rearwardly and downwardly and that the window opening and the glass panel correspond to the inclination thereof.

Where, as in the present instance, there is very little space between the upper section 13 of the closed glass channel and the roof or top 15, it is impossible to provide a ventilating slot at the forward edge of the window glass by sliding the glass rearwardly in a horizontal plane, this being due, of course, to the streamlining of the body and the proximity of the roof line. In accordance with the present invention, however, I have made it possible to produce such a ventilating slot in a streamlined body of the foregoing type by shifting the glass panel rearwardly and downwardly so that it follows a path corresponding substantially to the inclination of the window frame and roof line. To accomplish the necessary shifting of the window glass there is provided, by way of illustration, one form of window regulator mechanism suitable for this purpose. In the present instance such mechanism comprises a mounting plate 20 in the form of a bracket secured by screws or the like 21 to the inside of the rear quarter panel. The plate 20 carries a gear 22 secured for rotation with a shaft 23 which is operated by a crank or handle 24 (Fig. 2). Guide pins or studs 25 and 26 are mounted on the plate 20 and extend substantially at right angles to a face thereof.

Along the lower edge of the glass panel 14 a felt lined glass retaining channel 27 is secured. The bottom of the channel 27 is secured as by spot welding or the like to a member 28 (Fig. 3) which lies in a plane extending substantially at right angles to the plane of the glass panel 14. A plate 29, having arcuate cam slots 30 and 31 formed therein, is secured to the member 28 as by screws 32 or the like. The arcuate cam slots 30 and 31 in the depending plate 29 are designed to permit the desired angular movement required by the tilting of the glass panel 14 as hereinafter described. The plate 29 at all times lies in a plane substantially parallel to the plane of the glass panel 14.

The guide pins or studs 25 and 26 extend through the cam slots 30 and 31 and are each provided with a washer 33 which surrounds the pin or stud and is held against a face of the plate 29 by a spring 34 having its opposite end abutting on a stop 35 which is preferably screw threaded on the ends of the pins or studs 25 and 26. The plate 29 is thus held yieldingly against a face of the plate 20 and is free to move relative thereto within the limits of movement permitted by the guide pins or studs 25 and 26 in the cam slots 30 and 31.

The plate 29 is provided with a gear segment 40 which is formed on an arc which extends across the lower corner of the plate 29 adjacent the gear 22. The gear segment 40 is formed with gear teeth which mesh with the gear teeth on the gear 22 so that upon rotation of the gear 22 the plate 29 is moved angularly with relation to the plate 20. This angular movement is permitted and is controlled by the pins or studs 25 and 26 in the cam slots 30 and 31. The gear segment 40 and the cam slots 30 and 31 extend along arcuate lines which are designed to provide the maximum tilting movement of the glass panel 14 within the limits fixed by the curvature of the upper glass retaining channel 13.

From this construction it will be seen that when the gear 22 is rotated, the teeth of the gear mesh with the teeth of the gear segment 40 so that the plate 29 moves angularly with regard to the plate 20, and the cam slots 30 and 31 move relative to the pins or studs 25 and 26. The pins or studs 25 and 26 and the cam slots 30 and 31 serve to limit both the upward tilting movement and the downward tilting movement of the glass panel 14 while supporting the glass panel 14 at all times during its movement from the open to the closed position, and vice versa. This movement of the plate 29 is transmitted through the retaining channel 27 to the glass panel 14, and if the glass panel 14 is in the position shown in Fig. 1 it tends to tilt the panel 14 downwardly as the glass is shifted from the closed to the open or ventilating position and provides a ventilating slot 41 between the forward edge of the glass panel 14 and the rear edge of the window glass channel 12. During this movement the upper edge of the glass panel 14 rides in the upper glass channel section 13 and follows a path corresponding to the inclination of the said channel 13 and the inclination of the roof 15. When the glass is shifted from the ventilating position of Fig. 2 to the fully closed position of Fig. 1, a reverse tilting movement of the glass panel 14 is effected and the glass and retaining channel is shifted from an angular tilted position to a horizontal position. As shown in Fig. 1, when the glass is in the closed position the glass retaining channel 27 lies beneath and extends on a line substantially parallel to the window sill 42. When, however, the window panel 14 is tilted as above described to provide the ventilating slot or opening 41, the glass retaining channel 27 lies beneath and at an angle to the line of the window sill 42.

When the glass panel 14 is in the fully open or ventilating position shown in Fig. 2, the pins or studs 25 and 26 abut against the upper ends of the cam slots 30 and 31 and act with the gear 22 and the gear segment 40 to support the panel 14 in this position.

To assemble the regulator mechanism the pins or studs 25 and 26 are passed through the slots 30 and 31 and the washers 33 are placed thereon and against the plate 29. The springs 34 are then placed over the ends of the pins or studs 25 and 26 and the stop 35 is screw threaded thereon. This joins the plates 20 and 29 while permitting sliding movement of the plate 29 relative to the plate 20 in a vertical plane.

Another construction which is within the purview of the present invention contemplates the placement of a washer between the adjoining face of the plate 29 and the plate 20 and the formation of an enlarged head upon the pins or studs 25 and 26 as by riveting or the like. The construction herein described eliminates rattle between the plates but the same result may be achieved by the use of a washer of sound deadening material between the two plates.

The joined plates 20 and 29 are then secured to the vehicle body by the screws or similar fastening means 21 which extend through the plate 20. The glass retaining channel 27 and the member 28 are fastened together and the glass retaining channel 27 is secured to the lower edge of the glass panel 14. The glass panel 14 is placed in the window opening before the trim molding 43 is placed around the inside of the window opening.

The member 28 is then aligned with the top edge of the plate 29 and the fastening means 32 are passed through the member 28 and a turned edge of the plate 29 and join the regulator mechanism and the glass retaining channel 27 so that movement of the regulator mechanism is transmitted to the glass panel 14. Thereafter the trim molding 43 is secured in place. Thus it will be seen that the window regulator of the present invention may be easily and economically secured to the glass panel and may be easily disconnected therefrom by removal of the trim molding 43.

It will be understood that the window pillar 11 at the front edge of the window preferably juts out slightly beyond the outer face of the rear quarter panel to form a projection or baffle which deflects the air stream passing thereover and so provides a low pressure zone immediately behind and adjacent to it. Thus when the window glass is shifted to the open position to provide the ventilating slot 41, the suction in the low pressure zone withdraws air from within the body through the slot 41.

I claim:

1. In a vehicle body having a side window opening, a window glass mounted therein, an arcuate glass receiving channel member adjacent the top edge thereof and adapted to receive the upper edge portion of the window glass, regulator means for swinging said window rearwardly and downwardly while maintaining the upper edge in said arcuate glass receiving channel member thereby to provide a ventilating slot adjacent the forward edge of the glass, said regulator means comprising a pair of connected plates, one of said plates being secured to the vehicle body and the other of said plates being connected with the window glass and slidable relative to the plate secured to the vehicle body, and cooperating means carried by said plates for sliding the slidable plate simultaneously in its horizontal and vertical planes.

2. In a vehicle body having a side window opening, a window glass mounted therein, an arcuate glass receiving channel member adjacent the top edge thereof and adapted to receive the upper edge portion of the window glass, regulator means for swinging said window rearwardly and downwardly while maintaining the upper edge in said arcuate glass receiving channel member thereby to provide a ventilating slot adjacent the forward edge of the glass, said regulator means being effective to provide a simultaneous movement of the window in its horizontal and vertical planes and comprising a depending plate secured to the window glass, a fixed plate secured to the vehicle body, and means carried by said fixed plate and cooperating with said depending plate for effecting simultaneous movement thereof in its horizontal and vertical planes.

3. In a vehicle body having a side window opening, a window glass mounted therein, regulator means for moving said glass simultaneously in its horizontal and vertical planes to provide a ventilating slot at the forward upright edge of the glass, said regulator means comprising a traveling plate having a concave toothed gear segment thereon, a fixed plate secured to the vehicle body and carrying a rotatable gear having teeth meshing with the gear teeth of said concave toothed gear segment, and studs carried by one of said plates and extending through cam slots in the other of said plates for controlling movement of the window and supporting the window when in position to provide said ventilating slot.

4. In a vehicle body having a side window opening, a window glass mounted therein, an arcuate glass receiving channel member adjacent the top edge thereof and adapted to receive the upper edge portion of the window glass, and regulator means for moving said window simultaneously in its horizontal and vertical planes while maintaining the upper edge thereof in said arcuate glass receiving channel thereby to open and close a ventilating slot adjacent the forward edge of the glass, said regulator means comprising a depending plate secured to the lower edge of the window and provided with a curved gear segment substantially concentric with the curvature of said arcuate glass receiving channel, a fixed plate secured to the vehicle body, and connecting members extending between said pending plate and said fixed plate and attached to one thereof to guide said depending plate in its movement relative to said fixed plate.

5. In a vehicle body having a side window opening, a window glass mounted therein, and regulator means for swinging said glass rearwardly and downwardly to provide a ventilating slot at the forward upright edge of the glass, said regulator means comprising a movable plate having a toothed gear segment thereon, arcuate guide slots provided in said movable plate, a fixed plate secured to the vehicle body and carrying a rotatable gear having teeth meshing with the gear teeth of the said toothed gear segment on said movable plate, and studs secured to said fixed plate and extending outwardly therefrom and through said arcuate slots whereby the window is guided in its movements and supported in the ventilating position by said studs contacting with the edges of said slots.

6. In a vehicle body having a side window opening, a window glass mounted therein, and regulator means for moving the lower edge of said glass downwardly and at an angle to the window sill to provide a ventilating slot at the forward edge of the glass, said regulator means comprising a slidable plate secured to the lower edge of the window glass and a fixed plate secured to the vehicle body, and means carried by said fixed plate and cooperating with said slidable plate for guiding said slidable plate rearwardly and downwardly in a plane substantially parallel to the face of said fixed plate.

7. In a vehicle body having a side window opening, a window glass mounted therein, regulator means for moving said glass downwardly and at the same time tilting the glass rearwardly to produce a ventilating slot at the forward edge of the glass, said regulator means comprising a plate connected to the glass and mounted for swinging movement and sliding movement relative to a pivot member, and operating mechanism for simultaneously sliding and swinging said plate about the pivot member and relatively thereto.

8. In a vehicle body having a side window opening provided at its upper edges with a rearwardly and downwardly inclined glass receiving channel, a window glass having a correspondingly inclined upper edge confined within said channel, and regulator means for shifting said glass in an inclined path corresponding substantially to the inclination of said channel to provide a ventilating opening at the forward edge of the glass while maintaining said upper edge of the glass within the channel, said regulator means comprising a fixed plate secured to the vehicle body, a depending plate secured to the lower edge of the glass and connected for swinging movement relative to said fixed plate, and means for swinging said depending plate in an arc corresponding substantially to the arc of inclination of said inclined glass receiving channel.

9. In a vehicle body, a side window frame defining a window opening having downwardly and rearwardly inclined forward and upper marginal edges, a window glass mounted in said opening and having correspondingly inclined edges, and means for shifting the glass to cause said upper edge of the glass to follow the line of the upper edge of the window opening and to withdraw the forward edge of the glass rearwardly from the forward edge of the window opening to provide a ventilating slot, said regulator means comprising a fixed plate secured to the vehicle body and a swinging plate secured to the lower edge of the window glass, and operating means carried by said fixed plate and connected with said swinging plate for moving said swinging plate through an arc corresponding substantially to the arc of inclination of the upper edge of the window opening.

10. In a vehicle body having a side window opening, a window glass mounted therein for swinging movement in a rearward and downward direction to provide a ventilating slot at the forward upright edge of the glass, and regulator means for swinging said window comprising a swinging plate having a toothed gear segment thereon, a fixed plate secured to the vehicle body and carrying a rotatable gear having teeth meshing with the gear teeth of said toothed gear segment on said swinging plate, and cooperating means on said plates for guiding the movement of said swinging plate relative to said fixed plate whereby rotation of said rotatable gear effects a movement of said swinging plate through an arc generated by a radius having its axis moving in a curved path, the rear lower edge of the said glass moving downwardly a greater distance than the forward lower edge thereof.

11. In a motor vehicle body, a window opening, a glass receiving runway channel surrounding said opening, a window glass mounted in said channel for movement relative thereto to provide a ventilating opening adjacent the forward edge of the window glass; a window regulator mechanism comprising a plurality of plates, one of said plates being adapted to be fixed to the vehicle body, another of said plates being mounted for movement relative thereto and adapted to be secured to the said window glass, and actuating mechanism carried by said plates and cooperating to effect movement of said second-named plate and the said window glass whereby the said window glass is moved simultaneously rearwardly and downwardly in said channel to provide a ventilating slot adjacent the forward edge thereof.

12. In a motor vehicle body, a window opening, a glass receiving runway channel surrounding said opening, a window glass mounted in said channel for movement relative thereto to provide a ventilating opening adjacent the forward edge of the window glass; a window regulator mechanism comprising a plurality of plates, one of said plates being adapted to be fixed to the vehicle body, another of said plates being mounted for movement relative thereto and adapted to be secured to the said window glass, cooperating gear members carried by said plates, and guide members secured to said first-named plate and extending through cam slots in said second-named plate, said gear members, guide members and cam slots cooperating to effect a rearward and downward movement of said second-named plate and the said window glass whereby the said window glass is moved rearwardly and downwardly in said channel to provide a ventilating slot adjacent the forward edge thereof and is supported in its ventilating position on said guide members.

13. In a vehicle body having a side window opening, a window glass mounted therein, and a single regulator mechanism for moving said glass simultaneously rearwardly and downwardly in a direction longitudinally of the body to provide a ventilating slot at the forward upright edge of the glass; said regulator mechanism comprising a fixed plate secured to a vehicle body member, a movable plate connected to the window glass and secured to said fixed plate for sliding movement relative thereto, and gear members carried respectively on said fixed plate and said movable plate and having their teeth in meshed relation whereby movement of the gears effects sliding movement of said movable plate relative to said fixed plate to tilt the glass rearwardly and/or forwardly in its plane to produce and/or close a ventilating opening at the forward edge of the glass.

14. In a window regulator mechanism to effect tilting movement of a window glass in a retaining channel, a pair of plates, one of said plates comprising a bracket portion and a face portion and adapted to be rigidly mounted adjacent the window glass, the other of said plates being adapted for attachment to the window glass and being carried on the face portion of said first-named plate and movable relative thereto, guide members mounted on said first-named plate and extending through said second-named plate, and cooperating gear members carried on said plates for tilting said second-named plate and said window glass rearwardly and/or forwardly in their planes relative to said first-named plate.

15. In a window regulator mechanism to effect tilting movement of a window glass in a retaining channel, a pair of plates, one of said plates comprising a bracket portion and a face portion and adapted to be rigidly mounted adjacent the window glass, the other of said plates being adapted for attachment to the window glass and having arcuate cam slots formed therein, guide members on said first-named plate extending through said arcuate cam slots in said second-named plate, and actuating means carried by said plates and operable to tilt said second-named plate and said window glass rearwardly and/or forwardly relative to said guide members whereby the second-named plate and window glass are directed in their movements and are supported on said guide members.

JOHN H. ROETHEL.